United States Patent
Oddon

(10) Patent No.: US 11,554,607 B2
(45) Date of Patent: Jan. 17, 2023

(54) NON-PNEUMATIC TIRE HAVING A COMPOSITION COMPRISING A THERMOPLASTIC POLYMER AND A THERMOPLASTIC ELASTOMER

(71) Applicant: COMPAGNIE GENERALE DES ETABLISSEMENTS MICHELIN, Clermont-Ferrand (FR)

(72) Inventor: Mathieu Oddon, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 483 days.

(21) Appl. No.: 16/625,492

(22) PCT Filed: Jun. 19, 2018

(86) PCT No.: PCT/FR2018/051486
§ 371 (c)(1),
(2) Date: Dec. 20, 2019

(87) PCT Pub. No.: WO2018/234693
PCT Pub. Date: Dec. 27, 2018

(65) Prior Publication Data
US 2021/0362548 A1    Nov. 25, 2021

(30) Foreign Application Priority Data
Jun. 22, 2017   (FR) ........................... 1755691

(51) Int. Cl.
*B60C 1/00* (2006.01)
*B60C 7/14* (2006.01)
(Continued)

(52) U.S. Cl.
CPC ............. *B60C 1/00* (2013.01); *B60C 7/146* (2021.08); *B60C 7/18* (2013.01); *C08L 75/04* (2013.01);
(Continued)

(58) Field of Classification Search
CPC .. B60C 1/00; B60C 7/146; B60C 7/18; B60C 2001/0091; B60C 2007/005; B60C 7/14;
(Continued)

(56) References Cited

U.S. PATENT DOCUMENTS 7,201,194 B2   4/2007   Rhyne et al.
9,403,406 B2   8/2016   Custodero et al.
(Continued)

FOREIGN PATENT DOCUMENTS

EP   1420964        5/2004
FR   2963353 A1   2/2012
(Continued)

OTHER PUBLICATIONS

International Search Report dated Sep. 17, 2018, in corresponding PCT/FR2018/051486 (4 pages).

*Primary Examiner* — Andrew J. Oyer
(74) *Attorney, Agent, or Firm* — Venable LLP

(57) ABSTRACT

A structurally supported non-pneumatic tyre comprises a tread, an annular band, a plurality of spokes extending transversely and radially inside the annular band, and means for connecting the plurality of spokes to a wheel, characterized in that the spokes comprise a polymeric composition based on at least one polymeric matrix comprising 50 to 70% of one or more thermoplastic polymers, the glass transition temperature (Tg) of which is within a range extending from 120 to 250° C. and 30 to 50% of one or more thermoplastic elastomers, said thermoplastic elastomer(s) being compatible with said thermoplastic polymer(s), such
(Continued)

that the elongation at break of the mixture of these polymers is greater than or equal to the elongation at break of the thermoplastic polymer(s) alone.

20 Claims, 1 Drawing Sheet

(51) Int. Cl.
  *B60C 7/18* (2006.01)
  *C08L 75/04* (2006.01)
  *C08L 77/06* (2006.01)
(52) U.S. Cl.
  CPC ...... *C08L 77/06* (2013.01); *B60C 2001/0091* (2013.01)

(58) Field of Classification Search
  CPC .......... C08L 75/04; C08L 77/06; C08L 77/02; C08G 69/40
  See application file for complete search history.

(56) References Cited

U.S. PATENT DOCUMENTS

| | | |
|---|---|---|
| 2004/0159385 A1 | 8/2004 | Rhyne et al. |
| 2015/0231925 A1 | 8/2015 | Custodero et al. |
| 2018/0155539 A1* | 6/2018 | Delaunay ............... C08G 69/40 |

FOREIGN PATENT DOCUMENTS

| | | |
|---|---|---|
| WO | 2014/041167 A1 | 3/2014 |
| WO | 2016/016696 A1 | 2/2016 |
| WO | 2016/174314 A1 | 11/2016 |

* cited by examiner

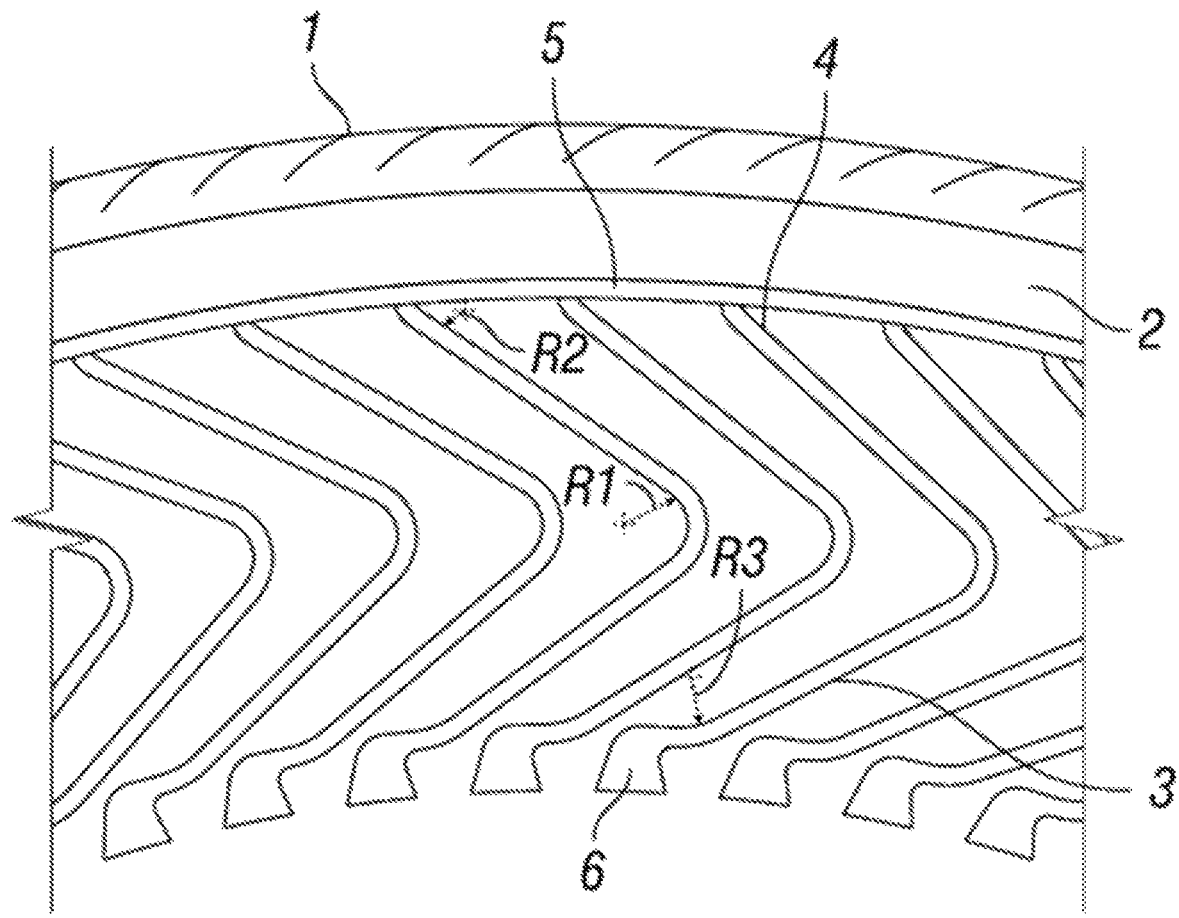

NON-PNEUMATIC TIRE HAVING A COMPOSITION COMPRISING A THERMOPLASTIC POLYMER AND A THERMOPLASTIC ELASTOMER

BACKGROUND

The present invention relates to a structurally supported non-pneumatic tyre and to the composition of the elements of this non-pneumatic tyre.

Structurally supported non-pneumatic tyres have been known for several years and are described especially in patent EP1420964. This type of structurally supported non-pneumatic tyre does not have a cavity intended to contain pressurized air and consequently has no need to form an airtight seal with the wheel rim in order to maintain the internal air pressure. This type of structurally supported non-pneumatic tyre comprises an annular band, a plurality of spokes extending transversely and radially inside the annular band, and means for connecting the plurality of spokes to a wheel, the annular band usually comprising a shear layer made of elastomer, at least one first membrane adhering to a portion located radially on the inside of the shear layer and at least one second membrane adhering to the portion located radially outside the shear layer, each of these membranes having an elastic modulus of longitudinal tension which is greater than the shear modulus of the shear layer.

A great deal of the properties of non-pneumatic tyres rely on the mechanical characteristics of the spokes which compose them. The latter must consist of a material which is both rigid and deformable, to withstand loading and transmit forces while deforming when the wheel rotates and when passing obstacles.

It is known to use materials of polyurethane type which meet these criteria, such as polyurethane of the Vibrathane B836 brand, described in document EP1420964. However, as is known to those skilled in the art, the processing time for polyurethanes is long. It would therefore be advantageous for the manufacturers of non-pneumatic tyres to have technical solutions which make it possible to reduce the manufacturing time of the spokes.

Moreover, it is constantly beneficial to lower the rolling resistance of tyres, also of non-pneumatic tyres, in order to reduce energy consumption during the use of the tyres.

Thus, it emerges from the prior art that there is a need to be able to reduce the manufacturing time of spokes for non-pneumatic tyres, and to lower the rolling resistance of these tyres.

In continuing their research, the applicant has now unexpectedly discovered that a particular composition for the spokes of non-pneumatic tyres made it possible to reconcile excellent properties of stiffness, of deformability and of low rolling resistance in non-pneumatic tyres using these compositions.

SUMMARY

Thus, according to a first subject, the present invention relates to a structurally supported non-pneumatic tyre comprising a tread, an annular band, a plurality of spokes extending transversely and radially inside the annular band, and means for connecting the plurality of spokes to a wheel, characterized in that the spokes comprise a polymeric composition based on at least one polymeric matrix comprising 50 to 70% of one or more thermoplastic polymers, the glass transition temperature (Tg) of which is within a range extending from 120 to 250° C. and 30 to 50% of one or more thermoplastic elastomers, said thermoplastic elastomer(s) being compatible with said thermoplastic polymer(s), such that the elongation at break of the mixture of these polymers is greater than or equal to the elongation at break of the thermoplastic polymer(s) alone.

BRIEF DESCRIPTION OF THE FIGURE

FIG. 1 schematically represents a cross-section in the equatorial plane of a tire according to the invention.

DETAILED DESCRIPTION OF THE INVENTION

The invention and its advantages will be easily understood in light of the detailed description and the exemplary embodiments.

In the present application, "rubber" or "elastomer" (the two terms being considered to be synonymous) is intended to mean any type of (diene or non-diene) elastomer; "diene rubber" is intended to mean any elastomer (single elastomer or mixture of elastomers) which is at least partially derived (either a homopolymer or a copolymer) from diene monomers, that is to say from monomers bearing two carbon-carbon double bonds, whether the latter are conjugated or unconjugated.

Moreover, unless expressly indicated otherwise, all the percentages (%) shown are percentages by weight.

Furthermore, the term "pcm" means, within the context of the present patent application, parts by weight per hundred parts of polymeric matrix, with all types of polymers taken together, especially thermoplastic elastomers and thermoplastic polymers taken together.

Any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

When reference is made to a glass transition temperature (Tg) for the description of the present invention, this is the Tg as measured by DSC according to standard ASTM D3418.

When reference is made to the elongation at break of a material or of a mixture of materials, this is the elongation at break as measured by tensile tests well known to those skilled in the art, which make it possible to determine the elasticity stresses and properties at break. Unless otherwise indicated, they are carried out in accordance with French standard NF T 46-002 of September 1988. Processing the tensile recordings makes it possible to plot the curve of modulus as a function of elongation. The breaking stresses (in MPa) and the elongations at break (EB in %) are also measured under standard conditions of temperature (23±2° C.) and of hygrometry (50±5% relative humidity) according to French standard NF T 40-101 (December 1979).

When reference is made to the Young's modulus of a material or of a mixture of materials, this is the Young's modulus at ambient temperature (23° C.) (as a reminder, initial tensile modulus), often denoted E, as measured according to a method well known to those skilled in the art. The force-elongation curves, measured for example according to standard ASTM D638-02 for bands more than 1 mm thick, or else according to standard ASTM D882-09 for thin layers, the thickness of which is at most equal to 1 mm, for example at 5 mm/min with an Instron Strain Gauge Extensometer, make it possible to deduce the values of the modulus E, expressed in MPa and calculated with respect to the initial cross section of the test specimen subjected to the tensile test.

In addition, when reference is made to a "predominant" compound, this is intended to mean, within the context of the present invention, that this compound is predominant among the compounds of the same type in the composition, that is to say that it is the one which represents the greatest amount by weight among the compounds of the same type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type.

1. Non-Pneumatic Tyre of the Invention

The structurally supported non-pneumatic tyre of the invention comprises a tread, an annular band, a plurality of spokes extending transversely and radially inside the annular band, and means for connecting the plurality of spokes to a wheel or hub.

The structure of the non-pneumatic tyre of the invention will be better understood with reference to the following description and FIG. 1 (FIG. 1) which schematically represents a cross section in the equatorial plane of a tyre according to the invention. The tyre represented is a preferred embodiment, the invention not being limited to this embodiment. The FIGURE is not shown to scale and the dimensions of certain elements have been enlarged or reduced for the sake of clarity of the illustration. "Equatorial plane" refers to a plane which passes perpendicularly to the axis of rotation of the tyre and divides the structure of the tyre. The "meridian plane" is a plane which crosses over, and comprises, the axis of rotation of the tyre.

The tyre represented in FIG. 1 bears a load by means of its structural elements, without the help of gas pressure. The tyre has a tread 1 in contact with the ground, an annular band 2 positioned radially inside the tread 1, a plurality of spokes 3 and 4 extending transversely and radially inside the annular band, an interface band 5, optional for the invention, supporting the spokes and located radially on the inside with respect to the annular band, and, as means for connecting the plurality of spokes to a wheel or hub, a widened end portion 6 of the spokes, suitable for engaging with a slit in the wheel or hub. The expression "extending transversely" used here means that the spokes may be axially aligned or may be diagonal with respect to the axis of the tyre. Furthermore, the expression "extending radially inside" means that the spokes may lie in a radial plane with respect to the axis of the tyre or may be diagonal with respect to the radial plane.

The annular band 2 supports the loads applied to the tyre.

A distinction may be made between two essential portions in the non-pneumatic tyre of the invention, one being the external portion composed of the tread and of the annular band, the other being the internal portion composed of the spokes and of the means for connecting to the wheel or hub.

1.1 External Portion

The structurally supported non-pneumatic tyre of the invention comprises at least one tread and an annular band. The tread may be of any type of elastomeric material, and may be sculpted for optimal contact with the ground.

When it is under load, the annular band has the ability to flex from a normal circular shape, to adapt to a contact surface such as a road surface.

The annular band preferably comprises one or more reinforced materials in an elastomeric composition.

The modulus of the elastomeric materials is the tensile elastic modulus with 10% elongation, measured according to the standard test method ASTM D412. The "shear modulus" of the elastomeric materials is the elastic shear modulus and is defined as being equivalent to a third of the tensile elastic modulus defined above for the elastomeric materials.

The reinforced materials preferably have an elastic modulus of circumferential tension which is sufficiently greater than the shear elastic modulus of the elastomeric composition so that, under a load applied from the outside, the portion in contact with the ground deforms to go from a substantially circular shape to a shape adapted to the surface of the ground, while retaining a substantially constant length of the annular band.

According to a preferred embodiment, the reinforced materials comprise substantially inextensible reinforcing elements embedded in an elastomeric coating. The reinforcing elements may be any materials suitable for serving as tyre reinforcers in conventional tyres, such as monofilaments or steel, aramid or other high-modulus textile cords.

Any suitable material may be used for the reinforced materials of the annular band, preferably such that it meets the conditions described below relating to the stiffness properties of the annular band. In other words, the structure of the reinforced materials may be any one of several alternatives, such as a homogeneous material (for example a thin metal sheet), a fibre-reinforced matrix or a layer having discrete reinforcing elements.

Preferably, for the annular band of the tyre of the invention, the ratio of the modulus of longitudinal tension of the reinforced material to the shear modulus of the elastomeric composition is at least approximately 100:1 and preferably at least approximately 1000:1.

1.2 Internal Portion

The structurally supported non-pneumatic tyre of the invention comprises, in addition to the tread and to the annular band, a plurality of spokes extending transversely and radially inside the annular band, and means for connecting the plurality of spokes to a wheel or hub.

According to a possible and preferred means for connecting the plurality of spokes to the wheel or hub, the spokes may be connected to one another by a radially internal mounting band which encircles the wheel or hub to mount the tyre.

Alternatively, each of the spokes may comprise a widened end portion suitable for engaging with a slit in the wheel.

As discussed above, the spokes act in tension to transmit loading forces between the wheel and the annular band, thereby supporting, alongside other functions, the weight of a vehicle. The wheel or hub may be considered to be suspended from the upper portion of the tyre. The spokes preferably have a high effective radial tensile stiffness. The tensile stiffness of the spokes is therefore an essential aspect of the non-pneumatic tyre of the invention and the particular composition of the spokes according to the invention makes it possible to achieve a high tensile stiffness of greater than 1 GPa, as shown in the following text.

The spokes also transmit the forces necessary to accelerate, stop and turn. The arrangement and the orientation of the spokes may be selected so as to obtain the desired function. For example, in applications in which relatively low circumferential forces are generated, the spokes may be arranged radially and parallel to the axis of rotation of the tyre. In order to provide stiffness in the circumferential direction, spokes perpendicular to the axis of rotation may be added, alternating with the spokes aligned on the axis. Another alternative consists in arranging the spokes diagonally with respect to the axis of the tyre, to provide stiffness in both the circumferential and axial directions. Another alternative consists in orienting the spokes in an alternating diagonal arrangement, in other words according to a zig-zag pattern as viewed in the equatorial plane.

According to a preferential embodiment of the invention, the spokes are V-shaped in the equatorial plane.

FIG. 1 presents a preferential embodiment of this V-shaped spoke geometry, thus having an internal portion (reference 3 in FIG. 1) and an external portion (reference 4 in FIG. 1), together forming an angle R1, the external portion forming an angle R2 with the annular band and the internal portion forming an angle R3 with the hub or the wheel.

During mounting, according to a preferred mode of the invention, the V-shaped spokes are pretensioned, that is to say radially stretched during the anchoring thereof to the wheel. This pretensioning enables improved comfort during the use of the tyre.

Thus, according to preferred layouts for the invention: each spoke may be oriented parallel to the axial direction, or else each spoke may be oriented diagonally with respect to the axial direction, or else spokes which are adjacent to one another are oriented according to diagonal opposed angles with respect to the axial direction, forming a zig-zag in the equatorial plane, or else the plurality of spokes is oriented in crossed pairs, forming an X-shaped pattern which repeats in the equatorial plane, or finally, and more preferentially, each spoke is V-shaped in the equatorial plane.

In one embodiment, the spokes may be connected to one another by a radially internal mounting band which encircles the wheel or hub to mount the tyre.

Preferably, the tyre may also comprise an interface band connecting the spokes to one another at the radially external ends thereof. This interface band is located radially on the inside with respect to the annular band, and thus connects the spokes to this annular band. For convenience, the spokes, the interface band and where appropriate the mounting band may be moulded in a single material in the form of a unit.

A virtually purely tensile loading support is obtained, due to the fact that a spoke is provided which has a high tensile stiffness.

The spokes must withstand the torsion between the annular band and the wheel, for example when a torque is applied to the wheels. Moreover, the spokes must withstand lateral deflection, for example when turning or steering. As will be understood, the spokes which lie in the radial-axial plane, that is to say which are aligned with the radial and axial directions, offer great resistance to axially directed forces but, in particular if they are elongated in the radial direction, may have difficulty withstanding torques in the circumferential direction.

For some vehicles and some applications, for example those producing relatively low acceleration forces, a set of spokes comprising relatively short spokes aligned with the radial direction is suitable.

According to the invention, and regardless of the layout of the spokes and the structural elements of the non-pneumatic tyre described above, the material which constitutes the spokes has a high tensile modulus. The spokes may be reinforced, if desired. In addition, it is desirable to have a material with a low hysteresis in the conditions of use. The composition of the spokes according to the invention is discussed in detail in part 2 below.

2. Composition of the Spokes of the Non-Pneumatic Tyre According to the Invention The spokes of the tyre of the invention comprise a polymeric composition based on at least one polymeric matrix comprising from 50 to 70% of one or more thermoplastic polymers, the glass transition temperature (Tg) of which is within a range extending from 120 to 250° C. and 30 to 50% of one or more thermoplastic elastomers, said thermoplastic elastomer(s) being compatible with said thermoplastic polymer(s).

For the present invention, said thermoplastic elastomer(s) are considered to be compatible with said thermoplastic polymer(s) when the elongation at break of the mixture of these polymers (thermoplastic elastomers and thermoplastic polymers) is greater than or equal to the elongation at break of the thermoplastic polymer(s) alone.

The thermoplastic polymers, the thermoplastic elastomers and the reinforcing fillers required for the invention will be described in detail below, as will the preferential embodiments of the invention.

2.1 Thermoplastic Polymer

The polymeric matrix of the composition of the spokes of the tyre according to the invention comprises 50 to 70% of one or more thermoplastic polymers, the glass transition temperature (Tg) of which is within a range extending from 120 to 250° C.

Preferably, for the purposes of the invention, the thermoplastic polymer(s) have a Tg within a range extending from 140 to 230° C., preferably from 150° C. to 220° C., better still from 160° C. to 210° C.

The thermoplastic polymer(s) are preferentially selected from the group consisting of polyamides, polycarbonates, and mixtures thereof.

The thermoplastic polymer(s) are preferably one or more amorphous polyamides, and the thermoplastic polymer(s) are more preferentially one or more homopolymeric or copolymeric amorphous polyamides consisting of cycloaliphatic and/or aromatic monomers.

As an example of a thermoplastic polymer suitable for the invention, mention may be made of the amorphous polyamide, Rilsan clear G170, from Arkema, which has a Tg of 168° C.

In the composition of the tyre of the invention, the thermoplastic polymer (that is to say the thermoplastic polymer(s)) represents from 50 to 70%, preferably from 55 to 65% by weight of all the polymers present in the composition.

2.2 Thermoplastic Elastomer

The polymeric matrix of the composition of the spokes of the tyre according to the invention comprises 30 to 50% of one or more thermoplastic elastomers (TPEs).

Generally, thermoplastic elastomers (abbreviated to "TPEs") have a structure intermediate between elastomers and thermoplastic polymers. These are block copolymers consisting of rigid thermoplastic blocks connected via flexible elastomer blocks.

For the requirements of the invention, said thermoplastic elastomer may preferably be a specific TPE, a block copolymer comprising at least one elastomer block of polyether type and at least one thermoplastic block of non-styrene type (TPNS). This elastomer is also denoted TPE containing polyether blocks and TPNS in the remainder of the application. In the following text, when reference is made to a polyether block, this is therefore an elastomeric block predominantly (that is to say to more than 50% by weight, preferably to more than 80% by weight) composed of a polymer resulting from the polymerization of ether-type monomers, and when reference is made to a non-styrene block, this is a block predominantly (that is to say to more than 50% by weight, preferably to more than 80% by weight) composed of a polymer resulting from the polymerization of monomers other than styrene compounds (that is to say styrene and substituted and/or functionalized styrenes).

Also, and preferentially, said thermoplastic elastomer may be another specific TPE, a block copolymer comprising at least one optionally hydrogenated butadiene/styrene random copolymer-type, (H)SBR, elastomer block and at least one styrene copolymer-type (PS) thermoplastic block. In the following text, when reference is made to an (H)SBR block, this is therefore an elastomeric block composed predominantly (that is to say to more than 50% by weight, preferably to more than 80% by weight) of a butadiene/styrene random copolymer, this copolymer possibly being or not being hydrogenated, and when reference is made to a styrene block, this is a block composed predominantly (that is to say to more than 50% by weight, preferably to more than 80% by weight) of a styrene polymer such as a polystyrene.

Thus, preferably for the purposes of the invention, the thermoplastic elastomer is selected from the group consisting of block copolymers comprising at least one elastomer block of polyether type and at least one thermoplastic block of non-styrene type, block copolymers comprising at least one elastomer block of optionally hydrogenated butadiene/styrene random copolymer type and at least one thermoplastic block of styrene type ((H)SBR-PS TPE), and mixtures of these thermoplastic elastomers. More preferentially, the thermoplastic elastomer is selected from the group consisting of block copolymers comprising at least one elastomer block of polyether type and at least one polyamide thermoplastic block (PEBA), block copolymers comprising at least one elastomer block of polyether type and at least one polyester thermoplastic block (COPE), block copolymers comprising at least one elastomer block of optionally hydrogenated butadiene/styrene random copolymer type and at least one thermoplastic block of styrene type ((H)SBR-PS TPE), and mixtures of these thermoplastic elastomers. More preferentially, the thermoplastic elastomer is selected from the group consisting of block copolymers comprising at least one elastomer block of polyether type and at least one polyamide thermoplastic block (PEBA), and mixtures of these thermoplastic elastomers.

The TPEs, and in particular the preferential TPEs, are described in more detail in the following text.

2.2.1. Structure of the TPE

The number-average molecular weight (denoted Mn) of the TPE is preferentially between 30 000 and 500 000 g/mol, more preferentially between 40 000 and 400 000 g/mol. Thus, it has been observed that a value within a range from 50 000 to 300 000 g/mol, and better still from 60 000 to 150 000 g/mol, was particularly well suited, especially to use of the TPE in a tyre tread composition.

The number-average molecular weight (Mn) of the TPE elastomer is determined, in a known manner, by size exclusion chromatography (SEC). For example, in the case of styrene thermoplastic elastomers, the sample is dissolved beforehand in tetrahydrofuran at a concentration of approximately 1 g/l and then the solution is filtered through a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analytical time is 90 min. A set of four Waters columns in series, with the Styragel tradenames (HMW7, HMW6E and two HT6Es), is used. The injected volume of the solution of the polymer sample is 100 The detector is a Waters 2410 differential refractometer and its associated software, for making use of the chromatographic data, is the Waters Millennium system. The calculated average molar masses are relative to a calibration curve produced with polystyrene standards. The conditions can be adjusted by those skilled in the art.

The value of the polydispersity index PI (reminder: PI=Mw/Mn, with Mw the weight-average molecular weight and Mn the number-average molecular weight) of the TPE is preferably less than 3, more preferentially less than 2 and more preferentially still less than 1.5.

In a known way, TPEs exhibit two glass transition temperature peaks (Tg, measured according to ASTM D3418), the lowest temperature being relative to the elastomer part (for example polyether) of the block TPE and the highest temperature being relative to the thermoplastic part (for example polyamide) of the TPE. Thus, the flexible blocks of the TPEs are defined by a Tg which is less than ambient temperature (25° C.), while the rigid blocks have a Tg which is greater than 80° C.

In the present patent application, when reference is made to the glass transition temperature of the TPE, it concerns the Tg relative to the elastomer block. The TPE preferably exhibits a glass transition temperature (Tg) which is preferentially less than or equal to 25° C., more preferentially less than or equal to 10° C. A Tg value greater than these minima can reduce the performance of the tread when used at very low temperature; for such a use, the Tg of the TPE is more preferentially still less than or equal to −10° C. Also preferentially, the Tg of the TPE is greater than −100° C.

The TPEs can be copolymers with a small number of blocks (less than 5, typically 2 or 3), in which case these blocks preferably have high weights of greater than 15 000 g/mol. These TPEs can, for example, be diblock copolymers, comprising a thermoplastic block and an elastomer block. They are often also triblock elastomers with two rigid segments connected by one flexible segment. The rigid and flexible segments can be positioned linearly, or in a star-branched or branched configuration. Typically, each of these segments or blocks often comprises at least more than 5, generally more than 10, base units (for example ether units and amide units for a polyamide/polyether/polyamide block copolymer).

The TPEs can also comprise a large number of smaller blocks (more than 30, typically from 50 to 500), in which case these blocks preferably have low weights, for example from 500 to 5000 g/mol; these TPEs will subsequently be referred to as multiblock TPEs and are an elastomer block/thermoplastic block series.

According to a first variant, the TPE is in a linear form. For example, the TPE is a diblock copolymer: thermoplastic block/elastomer block. The TPE can also be a triblock copolymer: thermoplastic block/elastomer block/thermoplastic block, that is to say a central elastomer block and two terminal thermoplastic blocks, at each of the two ends of the elastomer block. Equally, the multiblock TPE can be a linear series of elastomer blocks/thermoplastic blocks.

According to another variant of the invention, the TPE of use for the requirements of the invention is in a star-branched form comprising at least three branches. For example, the TPE can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to another variant of the invention, the TPE is provided in a branched or dendrimer form. The TPE can then be composed of a branched or dendrimer elastomer block and of a thermoplastic block located at the end of the branches of the dendrimer elastomer block.

2.2.2. Nature of the Elastomer Blocks

The elastomer blocks of the TPE for the requirements of the invention can be any elastomer known to a person skilled in the art.

The fraction of elastomer block in the TPE is within a range extending from 10% to 95%, preferentially from 20% to 92% and more preferentially from 25% to 90%.

These elastomer blocks preferably have a Tg (glass transition temperature) measured by DSC according to standard ASTM D3418, 1999, of less than 25° C., preferentially less than 10° C., more preferentially less than 0° C. and very preferentially less than −10° C. Also preferably, the Tg of the elastomer blocks is greater than −100° C. Blocks having a Tg of between 20° C. and −70° C., and more particularly between 0° C. and −50° C., are especially suitable.

The elastomer blocks of the TPE preferably have, in total, a number-average molecular weight (Mn) ranging from 25 000 g/mol to 350 000 g/mol, preferably from 35 000 g/mol to 250 000 g/mol, so as to confer, on the TPE, good elastomeric properties and a mechanical strength which is sufficient and compatible with the use as tyre tread.

According to a first preferred embodiment, the elastomer block is of butadiene/styrene random copolymer ((H)SBR) type. In a well known way, the (H)SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated.

Preferentially, use is especially made of an (H)SBR block having a styrene content for example within a range extending from 10% to 60% by weight, preferably from 20% to 50% by weight, and for the butadiene part, a content of 1,2-bonds within a range extending from 4% to 75% (mol %) and a content of 1,4-bonds within a range extending from 20% to 96% (mol %).

The determination of the degree of hydrogenation is carried out by $^1$H NMR analysis. The spectra are acquired on a Bruker Avance 500 MHz spectrometer equipped with a $^1$H-X 5 mm Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$, 100 µl of deuterated cyclohexane are added to carry out the lock during acquisition. The chemical shifts are calibrated relative to the protonated impurity of the $CS_2$ $^1$H δ ppm at 7.18 ppm, with reference to TMS ($^1$H δ ppm at 0 ppm). The $^1$H NMR spectrum makes it possible to quantify the microstructure by integration of the signal peaks characteristic of the different units:

The styrene originating from the (H)SBR and polystyrene blocks. It is quantifiable in the aromatics region between 6.0 ppm and 7.3 ppm for 5 protons (with subtraction of the integral of the signal of the $CS_2$ impurity at 7.18 ppm).

The PB1-2 originating from the (H)SBR. It is quantifiable in the ethylenics region between 4.6 ppm and 5.1 ppm for 2 protons.

The PB1-4 originating from the (H)SBR. It is quantifiable in the ethylenics region between 5.1 ppm and 6.1 ppm for 2 protons and with deletion of 1 proton of the PB1-2 unit.

The hydrogenated PB1-2 originating from the hydrogenation, and only having aliphatic protons. The pendent $CH_3$s of the hydrogenated PB1-2 were identified and are quantifiable in the aliphatics region between 0.4 and 0.8 ppm for 3 protons.

The hydrogenated PB1-4 originating from the hydrogenation, and only having aliphatic protons. It will be deduced by subtracting the aliphatic protons from the different units, considering it for 8 protons.

The microstructure may be quantified in terms of mol % as follows: mol % of a unit=$^1$H integral of a unit//($^1$H integrals of each unit). For example, for a styrene unit: mol % of styrene=($^1$H integral of styrene)/($^1$H integral of styrene+$^1$H integral of PB1-2+$^1$H integral of PB1-4+$^1$H integral of hydrogenated PB1-2+$^1$H integral of hydrogenated PB1-4).

Depending on the degree of hydrogenation of the (H)SBR block, the content of double bonds in the butadiene part of the (H)SBR block can decrease as far as a content of 0 mol % for a completely hydrogenated (H)SBR block. Preferably, in the TPEs with (H)SBR and PS blocks of use for the requirements of the invention, the (H)SBR elastomer block is hydrogenated such that a proportion ranging from 25 mol % to 100 mol % of the double bonds in the butadiene portion are hydrogenated. More preferentially, from 50 mol % to 100 mol % and very preferentially from 80 mol % to 100 mol % of the double bonds in the butadiene portion are hydrogenated.

The styrene part of the (H)SBR blocks may be composed of monomers chosen from styrene monomers, and especially selected from the group consisting of unsubstituted styrene, substituted styrenes and mixtures thereof. Among the substituted styrenes, those selected from the group consisting of methylstyrenes (preferentially o-methylstyrene, m-methylstyrene and p-methylstyrene, alpha-methylstyrene, alpha,2-dimethylstyrene, alpha,4-dimethylstyrene and diphenylethylene), para-tert-butylstyrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrenes), fluorostyrenes (preferentially o-fluorostyrene, m-fluorostyrene, p-fluorostyrene, 2,4-difluorostyrene, 2,6-difluorostyrene and 2,4,6-trifluorostyrenes), para-hydroxystyrene and mixtures thereof will preferentially be chosen.

According to a more preferred embodiment, the elastomer blocks may be of polyether type, in particular a polyether may be composed of monomers selected from cyclic ethers or alcohols, preferentially aliphatic cyclic ethers or alcohols, such as for example ethanol or tetrahydrofuran. Among the polyethers, those selected from the group consisting of polytetramethylene glycols (PTMGs), polyethylene glycols (PEGs), polypropylene ether glycol (PPG), polyhexamethylene ether glycol, polytrimethylene ether glycol (PO3G), poly(3-alkyltetrahydrofuran) and mixtures thereof will preferentially be chosen. The polyether is very preferentially selected from the group consisting of polytetramethylene glycols (PTMGs), polyethylene glycols (PEGs) and mixtures thereof.

The elastomer block may also consist of several elastomer blocks as defined above.

2.2.3. Nature of the Thermoplastic Blocks

Use will be made, for the definition of the thermoplastic blocks, of the characteristic of glass transition temperature (Tg) of the hard thermoplastic block. This characteristic is well known to those skilled in the art. It especially makes it possible to choose the industrial processing (transformation) temperature. In the case of an amorphous polymer (or polymer block), the processing temperature is chosen to be substantially greater than the Tg. In the specific case of a semicrystalline polymer (or polymer block), a melting point may be observed which is then greater than the glass transition temperature. In this case, it is instead the melting point (M.p.) which makes it possible to choose the processing temperature for the polymer (or polymer block) under consideration. Thus, subsequently, when reference is made to "Tg (or M.p., where appropriate)", it will be necessary to consider that this is the temperature used to choose the processing temperature.

For the requirements of the invention, the TPE elastomers comprise one or more thermoplastic block(s) preferably having a Tg (or M.p., where appropriate) greater than or equal to 80° C. Preferentially, this thermoplastic block has a Tg (or M.p., where appropriate) within a range extending from 80° C. to 250° C. Preferably, the Tg (or M.p., where appropriate) of this thermoplastic block is preferentially from 80° C. to 200° C., more preferentially from 80° C. to 180° C.

The fraction of thermoplastic block in the TPE is within a range extending from 5% to 90%, preferentially from 8% to 80% and more preferentially from 10% to 75%.

Preferably, according to the invention, the thermoplastic blocks of the TPE have, in total, a number-average molecular weight (Mn) ranging from 5000 g/mol to 150 000 g/mol, so as to confer, on the TPE, good elastomeric properties and a mechanical strength which is sufficient and compatible with the use as tyre tread.

According to a first preferred embodiment, the thermoplastic blocks of the TPE are formed from polymerized styrene monomers (PSs). The preferential polystyrenes (PSs) are obtained from styrene monomers selected from the group consisting of unsubstituted styrene, substituted styrenes and mixtures thereof. Among the substituted styrenes, those selected from the group consisting of methylstyrenes (preferentially o-methylstyrene, m-methylstyrene and p-methylstyrene, alpha-methylstyrene, alpha,2-dimethylstyrene, alpha,4-dimethylstyrene and diphenylethylene), para-tert-butylstyrene, chlorostyrenes (preferentially o-chlorostyrene, m-chlorostyrene, p-chlorostyrene, 2,4-dichlorostyrene, 2,6-dichlorostyrene and 2,4,6-trichlorostyrene), bromostyrenes (preferentially o-bromostyrene, m-bromostyrene, p-bromostyrene, 2,4-dibromostyrene, 2,6-dibromostyrene and 2,4,6-tribromostyrene), fluorostyrenes (preferentially o-fluorostyrene, m-fluorostyrene, p-fluorostyrene, 2,4-difluorostyrene, 2,6-difluorostyrene and 2,4,6-trifluorostyrene), para-hydroxystyrene and mixtures thereof will preferentially be chosen.

Very preferentially, the PS blocks are blocks obtained from unsubstituted polystyrene.

According to a variant of the invention, the polystyrene block as defined above can be copolymerized with at least one other monomer, so as to form a thermoplastic block having a Tg (or M.p., if appropriate) as defined above.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms.

Some particular TPEs, containing elastomer blocks of optionally hydrogenated butadiene/styrene random copolymer type and containing a thermoplastic block of styrene type ((H)SBR-PS TPE) are also sometimes denoted SOEs, and they are the most preferred for the requirements of the invention.

According to a more preferred embodiment, the thermoplastic blocks of the TPE are formed from polymerized non-styrene monomers (TPNSs). The non-styrene thermoplastic blocks (TPNSs) are non-styrene blocks, that is to say preferably thermoplastics resulting from the polymerization of any suitable monomer and not comprising styrene monomers, or comprising less than 5%.

Preferentially, the TPNS blocks are blocks selected from polyamide and polyester blocks and mixtures thereof. Very preferentially, the TPNS blocks are polyamide and/or polyester type blocks. Very preferentially, the TPNS blocks are selected from the group consisting of polyamides of PA6, PA11 or PA12 type, or polyesters of PET or PBT type and mixtures of the latter.

The particular TPEs containing polyether blocks, and particular TPNSs in which the non-styrene thermoplastic blocks are polyesters, are usually denoted TPE-E or TPC (thermoplastic copolyester) or else COPE (ether/ester block copolymer), and they are also preferred for the requirements of the invention.

The particular TPEs containing polyether blocks, and particular TPNSs in which the non-styrene thermoplastic blocks are polyamides, are usually denoted TPE-A or TPA (thermoplastic copolyamide) or else PEBA (amide block copolyether), and they are particularly preferred for the requirements of the invention.

The thermoplastic block may also consist of several thermoplastic blocks as defined above.

2.2.4. TPE Examples

By way of examples of commercially available TPE elastomers containing (H)SBR and PS blocks, mention may be made of SOE-type elastomers, sold by Asahi Kasei under the name SOE 51611, SOE L605, or else SOE L606.

By way of examples of commercially available TPE elastomers containing polyether blocks and TPNSs, mention may be made of PEBA elastomers of Pebax type sold by Arkema, for example under the name Pebax 4033, Pebax 6333, or else COPE elastomers of Pelprene P type, sold by Toyobo, for example under the name Pelprene P40B.

2.2.5. TPE Amount

In the composition of the spokes of the tyre of the invention, the TPE elastomer (that is to say the TEP elastomer(s)) represents from 30 to 50%, preferably from 35 to 45% by weight of all the polymers present in the composition.

2.3 Reinforcing Filler

The composition of the spokes of the tyre according to the invention may comprise one or more reinforcing fillers, and preferably, when the composition comprises same, at a total content in a range extending from 1 to 60 parts by weight per hundred parts of polymeric matrix (pcm).

Use may be made of any type of filler commonly used for the manufacture of tyres, for example an organic filler, such as carbon black, an inorganic filler, such as silica, or else a blend of these two types of filler, especially a blend of carbon black and silica.

All the carbon blacks conventionally used in tyres ("tyre-grade" blacks) are suitable as carbon blacks. Mention will more particularly be made, for example, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772), indeed even N990.

"Reinforcing inorganic filler" should be understood, in the present application, by definition, as meaning any inorganic or mineral filler (regardless of its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, especially any precipitated or fumed silica having a BET surface area and a CTAB specific surface area which are both less than 450 $m^2/g$, preferably from 30 to 400 $m^2/g$. Mention will be made, as highly dispersible precipitated silicas (HDSs), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

Preferably for the invention, the reinforcing filler is carbon black and/or silica. According to a preferred embodiment, the predominant reinforcing filler is carbon black. According to another embodiment, which is even more preferred, the predominant reinforcing filler is silica.

The content of reinforcing filler is preferentially within a range extending from 20 to 50 phr, more preferentially from 3 to 30 phr and better still from 5 to 20 phr.

2.4. Various Additives

The composition of the spokes of the tyre according to the invention, in addition to its essential constituents detailed above, may comprise additives added to the composition, these additives possibly being, as is well known to those skilled in the art, for example other elastomers, agents for protecting against ageing, plasticizers, non-reinforcing fillers, reinforcing resins (such as resorcinol or bismaleimide) or else a crosslinking system.

When the composition comprises same, the crosslinking system may especially be a "vulcanization" system, that is to say a system based on sulphur (or on a sulphur-donating agent) and on a vulcanization accelerator. Various known secondary accelerators or vulcanization activators, such as stearic acid, zinc oxide, guanidine derivatives, retarders or anti-reversion agents, may be added to this base vulcanization system.

Preferably, according to the invention, the composition does not comprise a crosslinking system.

3. Properties of the Composition of the Spokes

The composition of the spokes of the tyre according to the invention, as described above, makes it possible to obtain particular properties and in particular a high Young's modulus. High Young's modulus is intended to mean a modulus especially of greater than 1000 MPa, preferably greater than 1100 MPa.

It is known that high-modulus compositions, typically greater than 1000 MPa, generally have a low elongation at break, that is to say commonly less than 5%. With the compositions described for the spokes of the tyre of the invention, it is possible to obtain a greater elongation at break, which affords the tyre of the invention good resistance to deformation.

Thus, preferentially, in the spokes of the tyre according to the invention, the composition of the spokes has an elongation at break at 23° C. of greater than 8%, preferably greater than or equal to 10%.

EXEMPLARY EMBODIMENTS OF THE INVENTION

1. Preparation of the Compositions

Compositions T1, T2, T3, T4 and C1 were produced on a Kraus Maffei extruder by mixing all the ingredients (Rilsan Clear G 170 polyamide from Arkema, where appropriate copolyamide containing ether block (PEBA), Pebax 7033 from Arkema, and where appropriate N234 series carbon black from Cabot) at a temperature varying from 250 to 280° C. The granules obtained are then introduced into an injection-moulding press, enabling the shaping of the spokes, with measurement of the cycle times (processing times).

2. Tests Carried Out on the Compositions 1 mm sheets as obtained above are subsequently cut up using a Zund cutting table in order to obtain 2.5 mm*200 mm*1 mm test specimens for the measurements of Young's modulus, breakage test specimens for the measurements of elongation at break, and 20 mm*10 mm*1 mm "bar" specimens for the measurement test of tan(delta) by DMA.

Tan(delta) is measured at 23° C. on a DMA viscosity analyzer (Metravib V A4000). The response of a sample of composition, subjected to an alternating sinusoidal stress in elongation with imposed deformation of 0.1% at a frequency of 10 Hz, as a function of temperature, according to standard ASTM D 1349-99, is recorded. The values of tan(delta) at 23° C. are taken in particular.

3. Results

The compositions produced are presented in Table 1 below.

TABLE 1

| Composition | T1 | T2 | T3 | T4 | C1 |
|---|---|---|---|---|---|
| Polyurethane (1) in pcm | 100 | 0 | 0 | 0 | 0 |
| Thermoplastic polymer (2) in pcm | 0 | 100 | 80 | 0 | 60 |
| Thermoplastic elastomer (3) in pcm | 0 | 0 | 20 | 100 | 40 |

(1) Vibrathane B836 polyurethane from Adiprene
(2) Rilsan Clear G 170 polyamide from Arkema
(3) Pebax 7033 copolyamide containing ether block (PEBA) from Arkema The results of the tests carried out are presented in Table 2 below.

TABLE 2

| Composition | T1 | T2 | T3 | T4 | C1 |
|---|---|---|---|---|---|
| Young's modulus at 23° C. (MPa) | 50 | 2000 | 1350 | 640 | 1200 |
| Elongation at break at 23° C. (%) | 460 | 5 | 6 | 350 | 10 |
| Tan(d) at 23° C. | 0.07 | 0.03 | 0.03 | 0.08 | 0.03 |
| Processing time (min) | 30 | 5 | 5 | 5 | 5 |

It is observed that the invention makes it possible to obtain a material with the mechanical properties required for the spokes, which has a low degree of dissipation, and is injectable on a mass-production scale with shorter cycle times. Moreover, the low level of hysteresis, characterized by the tan(delta) at 23° C., makes it possible to considerably lower the hysteresis of the spokes and consequently to decrease the rolling resistance of the non-pneumatic tyre of the invention.

The invention claimed is:

1. A structurally supported non-pneumatic tire connectable to a wheel, the tire comprising;
   a tread;
   an annular band; and
   a plurality of spokes extending transversely and radially inside the annular band, wherein the spokes comprise a polymeric composition based on at least one polymeric matrix comprising:
      50 to 70% of one or more thermoplastic polymers, the glass transition temperature Tg of which is within a range extending from 120 to 250° C.; and
      30 to 50% of one or more thermoplastic elastomers, the one or more thermoplastic elastomers being compatible with the one or more thermoplastic polymers such that an elongation at break of a mixture of the one or more thermoplastic polymers and the one or more thermoplastic elastomers is greater than or equal to an elongation at break of the one or more thermoplastic polymers alone.

2. The tire according to claim 1, further comprising a mounting band connecting the radially internal ends of the spokes with one another.

3. The tire according to claim 1, wherein each of the spokes of the plurality of spokes includes a widened end portion suitable for engaging with a slit in the wheel.

4. The tire according to claim 1, wherein the annular band comprises one or more reinforced materials in an elastomeric composition.

5. The tire according to claim 1, wherein the spokes are positioned in a manner selected from the group consisting of each spoke is oriented parallel to an axial direction, each spoke is oriented diagonally with respect to the axial direction, adjacent spokes are oriented according to diagonal opposed angles with respect to the axial direction, adjacent spokes are oriented forming a zig-zag in an equatorial plane, the plurality of spokes is oriented in crossed pairs, the plurality of spokes is oriented forming an X-shaped pattern which repeats in the equatorial plane, and each spoke is V-shaped in the equatorial plane.

6. The tire according to claim 1, wherein the at least one polymeric matrix comprises from 55 to 65% of the one or more thermoplastic polymers.

7. The tire according to claim 1, wherein the at least one polymeric matrix comprises from 35 to 45% of the one or more thermoplastic elastomers.

8. The tire according to claim 1, wherein the one or more thermoplastic polymers have a Tg within a range extending from 140 to 230° C.

9. The tire according to claim 1, wherein the one or more thermoplastic polymers are selected from the group consisting of polyamides, polycarbonates, and mixtures thereof.

10. The tire according to claim 1, wherein the one or more thermoplastic polymers are one or more amorphous polyamides.

11. The tire according to claim 1, wherein the one or more thermoplastic polymers are one or more homopolymeric or copolymeric amorphous polyamides consisting of cycloaliphatic and/or aromatic monomers.

12. The tire according to claim 1, wherein the one or more thermoplastic elastomers are block copolymers, the elastomer blocks of which are polyether-type blocks.

13. The tire according to claim 12, wherein the one or more thermoplastic elastomers are one or more block copolymers, the elastomer blocks of which are selected from the group consisting of polytetramethylene glycols (PTMGs), polyethylene glycols (PEGs), polypropylene ether glycol (PPG), polyhexamethylene ether glycol, polytrimethylene ether glycol (PO3G), poly(3-alkyltetrahydrofuran), and mixtures thereof.

14. The tire according to claim 1, wherein the one or more thermoplastic elastomers are one or more block copolymers, the thermoplastic blocks of which are polyamide- and/or polyester-type blocks.

15. The tire according to claim 14, wherein the thermoplastic blocks are selected from the group consisting of polyamide PA6, polyamide PA11, polyamide PA12, PET-type polyesters, PBT-type polyesters, and mixtures thereof.

16. The tire according to claim 1, wherein the one or more thermoplastic polymers are one or more copolymers containing polyether and polyamide blocks (PEBAs).

17. The tire according to claim 1, wherein the spokes further comprise a reinforcing filler.

18. The tire according to claim 17, wherein the reinforcing filler is carbon black, silica, or a mixture of carbon black and silica.

19. The tire according to claim 1, wherein the polymeric composition does not comprise a crosslinking system.

20. The tire according to claim 1, wherein the polymeric composition has an elongation at break at 23° C. of greater than 8%.

* * * * *